Patented June 9, 1925.

1,541,478

UNITED STATES PATENT OFFICE.

GEORGE W. CARVER, OF TUSKEGEE, ALABAMA.

PAINT AND STAIN AND PROCESS OF PRODUCING THE SAME.

No Drawing. Application filed June 13, 1923. Serial No. 645,199.

*To all whom it may concern:*

Be it known that I, GEORGE W. CARVER, a citizen of the United States, residing at Tuskegee, in the county of Macon and State of Alabama, have invented certain new and useful Improvements in Paints and Stains and Processes of Producing the Same, of which the following is a specification.

The invention relates to paints and stains, and has as an object the provision of a process for producing paints and stains from clays. Clays are found in many sections of the country of a variety of colors, and by a proper choice of color there may be produced by the process of the invention a large variety of colors of pigments, fillers and stains for treating wood or other materials.

To carry out the process of the invention the desired clay having a high percentage of iron is treated by any of the well known processes for refining the same and reducing it to a finely divided condition. A desirable composition for a clay to be treated by the process of the present invention is 5.6% peroxide of iron and 16.7% aluminum.

While a clay testing as above described and substantially free from lime or any similar alkali is suitable for the carrying out of the process, yet a higher iron content will vary the effect only by improving the result.

To reduce the clay to a gelatinous condition the same is treated with acid. For this purpose taking as a basis a quantity of 25 pounds of clay free from sand or other objectionable substances, 25 pounds of commercial sulphuric acid and 25 pounds commercial hydrochloric acid may be added to the clay, with three pounds of clean scrap iron of any kind, iron turnings being a desirable form for the iron. The clay and iron are put into an acid-proof vessel which is capable of withstanding heat, as for instance a porcelain vessel. The acids are added with enough water to make a thin paste. The substance is then boiled slowly, with frequent stirring, until the iron is dissolved, and the whole mass assumes a uniform color.

Water free from alkali is then added sufficient to substantially double the volume, when the solution is well stirred and allowed to settle for about five minutes, for the purpose of settlement of coarser portions. The material remaining in suspension with the liquid is then decanted into shallow acid-proof vessels and the remaining coarse and insoluble material is thrown away.

The material thus secured is utilized as a base for subsequent steps, the nature of which, as well as the nature of the clay first taken for treatment may be chosen to vary the color of the resultant products.

As a variation of the above process the nitric acid may be added with the sulphuric and hydrochloric, but it is found that slightly inferior results are thus obtained. Moreover copperas may be substituted for the scrap iron with, however, probably not such fine results.

For use as a wood filler or stain, clay of a desired color may be treated with the acid as above described, and the thus secured gelatinous clay is found to strike into the wood fiber and to produce an exceedingly smooth surface, giving a color thereto dependent upon the color of clay chosen for treatment, thereby acting as a filler and stain with the single application. It is found that a filler made as thus described becomes very hard when dry and enables the wood to take a high polish. Moreover specimens of wood which have been thus treated are found, after twenty years, to be brighter and more beautiful than when first treated. For this use the iron scrap may be omitted if desired.

The material thus described as a compound filler and stain, may be dried and mixed with linseed oil or its equivalent as a pigment to provide a paint. If desired to be darkened to a slight extent some good grade of carbon or lamp black may be added.

When the above acid treatment is carried out utilizing a micaceous clay of the variety of shades which occur in the Southern States a sheen results that has not to my knowledge been secured by heretofore used artificial mixtures.

I claim:

1. The process of producing pigment or the like which comprises boiling clay and metallic iron with acid and separating the coarser particles therefrom.

2. The process of producing pigments or the like which comprises boiling a mixture of clay and scrap iron with a mixture of sulphuric and hydrochloric acid, and separating the coarser particles therefrom, the color of clay utilized being chosen in accordance with the color desired in the finished product.

GEORGE W. CARVER.